(12) United States Patent
van de Waal

(10) Patent No.: US 7,281,590 B2
(45) Date of Patent: Oct. 16, 2007

(54) ENVIRONMENTALLY FRIENDLY METHOD FOR GENERATING ENERGY FROM NATURAL GAS

(75) Inventor: Wouter Willem van de Waal, Rotterdam (NL)

(73) Assignee: Dropscone Corporation N.V., Willemstad, Curacao (AN)

( * ) Notice: Subject to any disclaimer, the term of this patent is extended or adjusted under 35 U.S.C. 154(b) by 43 days.

(21) Appl. No.: 10/149,041

(22) PCT Filed: Dec. 8, 2000

(86) PCT No.: PCT/NL00/00906

§ 371 (c)(1),
(2), (4) Date: Nov. 19, 2002

(87) PCT Pub. No.: WO01/61167

PCT Pub. Date: Aug. 23, 2001

(65) Prior Publication Data

US 2003/0141058 A1    Jul. 31, 2003

(30) Foreign Application Priority Data

Dec. 9, 1999    (NL) .................................... 1013804

(51) Int. Cl.
*F02B 43/00*    (2006.01)
*E21B 43/40*    (2006.01)

(52) U.S. Cl. .................................. 166/402; 166/305.1

(58) Field of Classification Search ............... 166/401, 166/402, 268, 305.1
See application file for complete search history.

(56) References Cited

U.S. PATENT DOCUMENTS

| | | | | |
|---|---|---|---|---|
| 3,343,369 A | * | 9/1967 | Polhamus | 405/272 |
| 4,246,966 A | | 1/1981 | Stoddard et al. | |
| 4,434,613 A | * | 3/1984 | Stahl | 60/784 |
| 4,465,401 A | * | 8/1984 | Stoddord et al. | 405/288 |
| 4,499,946 A | | 2/1985 | Martin et al. | |
| 4,528,811 A | | 7/1985 | Stahl et al. | |
| 5,417,286 A | * | 5/1995 | Palmer et al. | 166/308.1 |
| 5,419,396 A | * | 5/1995 | Palmer et al. | 166/252.1 |

(Continued)

FOREIGN PATENT DOCUMENTS

GB    2 117 053 A    10/1983

OTHER PUBLICATIONS http://www.dcnr.state.pa.us/topogeo/cbm/cbm_moreinfo.aspx {viewed Feb. 7, 2006}.*

(Continued)

*Primary Examiner*—John Kreck
(74) *Attorney, Agent, or Firm*—Weingarten, Schurgin, Gagnebin & Lebovici LLP

(57) ABSTRACT

The invention relates to an environmentally friendly method for generating energy from natural gas. Through the combustion of the natural gas with a mixture comprising substantially oxygen and $CO_2$, a number of advantages are achieved with regard to the emission of $CO_2$ and NOx. According to the invention, the $CO_2$-rich product gas is injected into a natural gas reservoir from which natural gas has been extracted. By the underground replacement of natural gas by $CO_2$, a pressure drop in the natural gas reservoir can be controlled, so that subsidence is prevented. Additionally, in this manner, the emission of $CO_2$ is reduced or even wholly prevented.

20 Claims, 1 Drawing Sheet

U.S. PATENT DOCUMENTS

Figure 1:
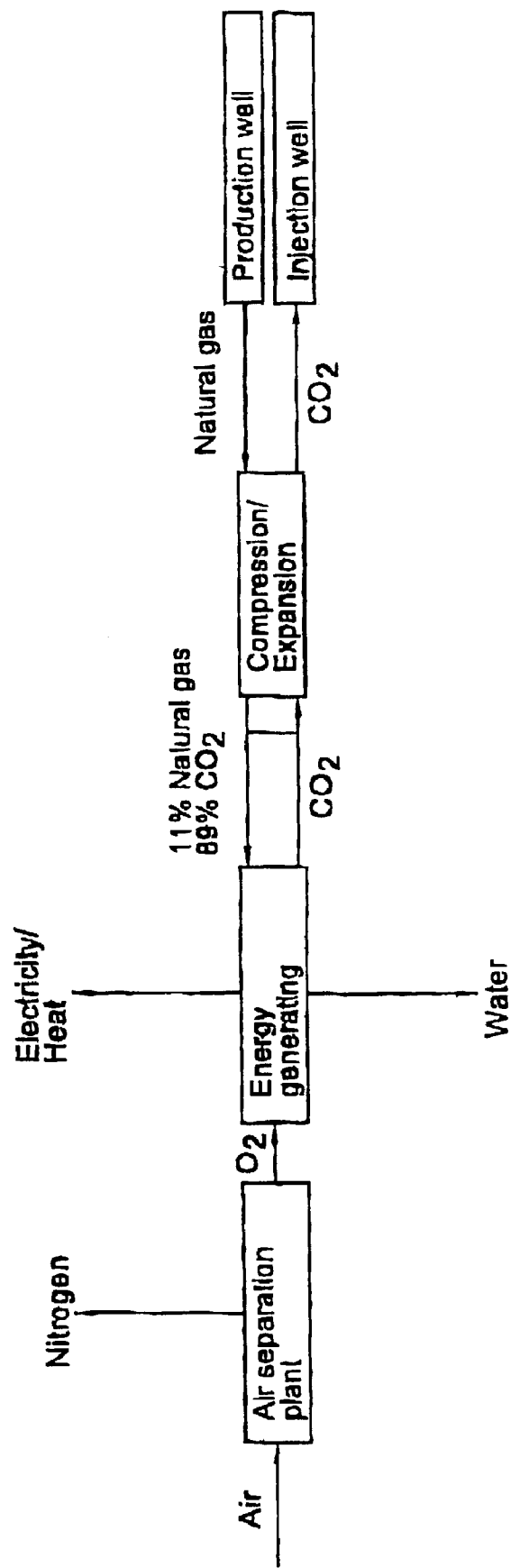

| | | | | |
|---|---|---|---|---|
| 5,566,756 A | * | 10/1996 | Chaback et al. | 166/263 |
| 6,244,338 B1 | * | 6/2001 | Mones | 166/245 |
| 6,820,689 B2 | * | 11/2004 | Sarada | 166/266 |
| 2003/0047309 A1 | * | 3/2003 | Thomas et al. | 166/265 |

OTHER PUBLICATIONS

"Coalbed Natural Gas Reservoir Solutions" p. 1, from http://www.welldog.com/pdf/WellDogIntro.pdf{viewed Feb. 7, 2006}.*

"Coalbed Methane" from http://www.spe.org/spe/jsp/shortcourse/0,2466,1104_1615_2568990,00.html {viewed Feb. 7, 2006}.*

"Hydrodynamics of Coalbed Methane Reservoirs in the Black Warrior Basin: Key to Understanding Reservoir Performance and Environmental Issues" abstract, from http://gsa.confex.com/gsa/2005AM/finalprogram/abstract_92395.htm {viewes Feb. 7, 2006}.* http://www.cnn.com/2003/TECH/science/11/19/greenhouse.gas.reut/ {viewed Feb. 7, 2006}.*

"Carbon dioxide storage prized" http://www.statoil.com/statoilcom/SVG00990.NSF/UNIDprint/01A5A730136900A3412569B90069E947?opendocument.*

* cited by examiner

ENVIRONMENTALLY FRIENDLY METHOD FOR GENERATING ENERGY FROM NATURAL GAS

The invention relates to a method for producing energy from natural gas coming from a natural gas reservoir. The invention fiber relates to the use of $CO_2$ from combustion gases as injection medium in natural gas reservoirs.

The extraction and subsequent combustion of natural gas for generating energy has a number of undesired effects on the environment.

The extraction of natural gas has as a result that the pressure in the natural gas reservoir decreases. This may lead to so-called compaction of the reservoir rock, which may cause undesired soil subsidence. The degree of compaction and the subsequent soil subsidence is highly dependent on the soil conditions between the reservoir and the surface, the properties of the reservoir rock and the pressure decrease caused by gas extraction. Depending on the location of the natural gas reservoir, however, minor subsidence may already result in major damage to the environment, including any buildings present therein.

Additionally, in the combustion of natural gas, waste products, in particular water, $CO_2$ and nitrogen oxides (NOx) are formed. The carbon dioxide is an undesired product, since this gas is considered one of the main causative agents of the so-called greenhouse effect. NOx is noxious because it can lead to acid rain and smog formation.

Moreover, the decrease of the pressure in the natural gas reservoir has as a result that, during exploitation, in time, the pressure falls to the extent where it is no longer profitable to further exploit the reservoir. Although in some cases the natural affluence of water is such that the decrease in the pressure caused by the extraction of natural gas is to some extent compensated for, this compensation is often not sufficient. In the state of the art, for this reason inter alia, use is made of injection of gases or water to maintain the pressure in the natural gas reservoir. It has been proposed, for instance, to use an inert gas, such as nitrogen, as a replacement for the extracted natural gas. A drawback of the use of nitrogen is that it is expensive and therefore this method is often economically not profitable. In natural gas extraction, injection of air is not attractive because of the reactivity of oxygen with natural gas. As an alternative, use is sometimes made of injection of water. However, this has as a disadvantage that with this method, the natural gas is replaced with the fluid water. The reservoir then becomes filled with water, so that the pressure distribution in the reservoir changes, which can lead to disruptions at the earth's surface.

Another result of pressure drop in combination with affluence of and/or injection of water is that a part of the natural gas is entrapped in the subterranean rock. If this rock becomes submerged in water, the extraction of the gas trapped therein is rendered more difficult. Also, the economic life of the reservoir is shortened because the water content in the extracted natural gas increases as a result of the injected water. If the water content is too high, further exploitation of the natural gas reservoir is no longer attractive.

The object of the present invention is to provide a method for generating energy from natural gas, which method removes the above-mentioned disadvantages at least partly.

It has been found that a method in which the combustion of natural gas takes place in the presence of substantially oxygen and $CO_2$, and in which the $CO_2$ originating from the combustion gases of the natural gas combustion plant is injected into the natural gas reservoir, resolves the above-mentioned problems at least partly.

Therefore, the invention is characterized by a method for producing energy from natural gas, comprising the steps of; a) converting natural gas coming from a natural gas reservoir, in the presence of substantially oxygen and $CO_2$, into a flow comprising $CO_2$ and water, whereby energy is generated; b) removing at least a part of the water from the flow comprising $CO_2$ and water, so that a product flow is obtained; and c) injecting at least a part of the product flow into a natural gas reservoir from which natural gas has been extracted. Such a method does not possess, or does so to a limited extent only, the disadvantages entailed in the known methods.

Owing to the natural gas being combusted in the presence of substantially oxygen and $CO_2$, a substantial reduction in the production of NOx is achieved. The fact is that in the usual combustion processes, NOx is formed to a considerable extent from nitrogen coming from the air. Although according to the invention total absence of nitrogen is not required, it will be clear that the use of a gas mixture with a nitrogen content lower than in air will lead to a lower production of NOx. Preferably, the natural gas is combusted in the present of substantially no other gases than oxygen and $CO_2$ and any gases present as contaminant in the natural gas.

The generation of energy in step a) occurs by combusting the natural gas in a suitable combustion unit, known per se. In the combustion of natural gas, which comprises mainly methane and additionally, possibly, other light hydrocarbons, and, according to the invention, a varying content of $CO_2$, in any case heat is released which can be usefully employed, for instance by applying heat exchanger.

Another important advantage of the invention is that by injecting at least a part of the product flow referred to into the natural gas reservoir, geothermal energy can be recovered. This means that the injected gas flow warms as a result of the terrestrial heat. This is advantageous because the produced natural gas flow does not have to be heated, or less so, before being converted according to the invention, which, for instance for some gas engines, is desired or necessary. Also, if heating the natural gas flow before converting it in step a) is not necessary or desired, this heat of geothermal origin can also be recovered with a heat exchanger and be usefully employed. The possibility of recovering geothermal energy renders the process even more attractive economically. The magnitude of the geothermal temperature gradient is highly dependent on the geographical location and varies considerably worldwide. For instance, in a Dutch field of natural gas, this can be approximately 3° C. per 100 meters. The depth of fields of natural gas also varies considerably worldwide. A typical depth for the Netherlands is, for instance, 3-5 km.

Thus, for instance, for a field of a depth of 3 km, a $CO_2$-containing gas of 20° C. and at a pressure of 60-80 bar can be injected, this $CO_2$-containing gas being, for instance, obtained by cooling the combustion gases of step a) to 20° C. Depending on the depth of the reservoir and the geothermal gradient, natural gas can then be obtained at the production side of the field at, for instance, 100° C. with a pressure of 150-200 bar. As said, these values strongly depend on the depth of the reservoir, the prevailing geothermal temperature gradient and other geographically strongly differing factors.

It is also possible to generate work, for instance by having the combustion take place in a gas engine. The work thus produced can, for instance, be used for the production of electricity. An important difference between the method according to the invention and conventional methods is that the combustion takes place in the presence of substantially $CO_2$ and oxygen instead of air. Nevertheless, customary means cam be applied for combusting natural gas in the presence of $CO_2$ and oxygen and thus generating energy. Therefore, a gas engine for use in the method according to the invention does not need to differ essentially from a conventional gas engine, i.e. a gas engine suitable for use with natural gas and oxygen coming from air. Generally, natural gas can be combusted without many problems in the presence of substantially oxygen and $CO_2$ instead of in the presence of substantially oxygen and nitrogen coming from air, as is customary. When used in a gas engine, possibly adaptations known per se to the skilled person can be sufficient to have this gas engine function with optimum efficiency. Particular advantage is obtained by generating in step a) both heat and work by using a so-called total energy plant (WKK plant).

By generating energy, the natural gas flow is converted in the presence of oxygen and $CO_2$ into a flow comprising substantially water and $CO_2$. Additionally, usual combustion products, such as carbon monoxide and unburned hydrocarbon can be present in a minor amount. These additional combustion products form, in principle, no impediment to carrying out the method according to the invention. According to the invention, this flow of combustion products is first, at least partly, stripped of the water. This can be done, for an important part, by cooling the flow so that the water condenses and can be separated. The heat which is thereby abstracted from the gas flow can also be usefully employed.

In customary methods for generating energy from natural gas, the off-gases of the combustion step are usually exhausted to the atmosphere. For this reason, these gases need to have a sufficiently high temperature to enable exhaustion by means of, for instance, a chimney. Because the product flow formed according to the method does not have to be exhausted into the atmosphere, it can be cooled deeper, for instance to 20° C., in step b) and therefore more heat can be recovered from the off-gases of step a) so as to be usefully applied, which offers a clear advantage.

Subsequently, the obtained product flow, or a part thereof, is injected according to the invention in step c) into a natural gas reservoir from which natural gas has been extracted. To that end, customary means are applied. The part of the product flow to be injected is brought to the proper pressure with the aid of a compressor. This compressor can, for instance, be driven with the energy generated in step a). Advantageously, however, this compressor is coupled to an expansion unit. This expansion unit serves to bring the extracted natural gas to a pressure desired for further processing. In the expansion unit, according to this embodiment, the energy which is released when expanding the extracted natural gas is used for driving the compressor.

If a part of the product flow is not injected, it can be exhausted. In view of the above-mentioned $CO_2$ issue, however, the product flow is for a considerable part, and preferably entirely, injected into a natural gas reservoir.

It is preferred to keep the pressure of the natural gas reservoir as constant as possible. As mentioned above, undesired subsidence can be prevented in this manner. This means that for each unit of volume of natural gas which is extracted from the reservoir, preferably a more or less equal unit of volume of product gas is injected in its place. To keep the pressure in the reservoir constant, it may be necessary to supplement the product flow with $CO_2$ or another suitable gas or possibly water, which is obtained from elsewhere. Although in this connection the above-mentioned disadvantages are associated with the use of water, these disadvantages naturally apply to a lesser extent if not exclusively water is used is an injection medium. The water can also originate from the conversion step a), in which case, accordingly, less water needs to be abstracted from this flow in step b).

The oxygen flaw or oxygen-rich flow necessary or obtaining the proper $CO_2$/oxygen ratio in step a) can be obtained from elsewhere. Particular advantage can be obtained, however, when this oxygen is made by separation of air, for instance by means of techniques known per se, such as cryogenic separation techniques and/or membrane separation techniques. The energy which is necessary for this separation can very advantageously be obtained from the energy generating step a), for instance in the form of electricity. As an additional advantage, in this manner a gas flow can be obtained which, in relation to air, has an increased nitrogen content. Depending on the intended use and the operating conditions of the method, the purity of this nitrogen-rich flow can be adjusted. When this nitrogen-rich flow is, for instance, applied as an additional injection medium, as mentioned hereinabove, it must possess a sufficiently low concentration of oxygen to prevent explosions hazards.

According to another preferred exemplary embodiment, the oxygen applied in step a) is obtained by converting water into hydrogen and oxygen, while the water can be obtained from elsewhere. Preferably, this conversion is carried out by means of electrolysis of the water. In this manner, in addition to a flow of oxygen or oxygen-rich gas, a flow of hydrogen or hydrogen-rich gas is obtained. The produced hydrogen can be deployed in different applications known to the skilled person. For instance, the produced hydrogen can be combusted, so as to generate energy, which energy can for instance contribute to the energy need of the step for producing the oxygen flow.

The proper ratio between $CO_2$ and oxygen can be achieved by supplying these gases, for instance in the form of a previously prepared mixture, to the combustion unit. The proportion of $CO_2$ and oxygen in such a mixture depends on the $CO_2$ content in the natural gas. The $CO_2$/oxygen mixture can be obtained by mixing the oxygen flow or oxygen-rich flow with a $CO_2$ flow or $CO_2$-rich flow. Although the $CO_2$ can be obtained from elsewhere, the present invention specifically contemplates the use of $CO_2$ originating from the product flow mentioned. To this end, it is necessary that the product flow is sufficiently stripped of water to enable the combustion unit to function properly. The $CO_2$/oxygen mixture is supplied to the combustion unit as a continuous flow.

As stated, the composition of this flow is adjusted to the composition of the natural gas flow, especially in relation to the $CO_2$ present in the natural gas flow. As a result of the injection of (part of) the product flow into the natural gas reservoir, the extracted natural gas, in a continuous implementation of the method, will have a $CO_2$ concentration which increases over time. To enable a continuous implementation of the method, it is necessary that per time unit a molar flow of methane (and possibly other light hydrocarbons) adjusted in magnitude to the combustion unit, and a molar flow of oxygen adjusted thereto are supplied to the combustion unit. Thine amount of $CO_2$ which is to be applied to obtain a suitable $CO_2$/oxygen mixture therefore depends inter alia on the composition of the extracted natural gas. The natural gas flow can be sampled with customary means to determine the $CO_2$ content. Further, with customary regulating means the $CO_2$ supply can be regulated such that a suitable $CO_2$/oxygen mixture is obtained.

Assuming that, for a good combustion of methane, a mixture with 80 vol. % $CO_2$ and 20 vol. % oxygen is suitable, this means that a natural gas flow which contains up to approximately 89 vol. % $CO_2$ can still be combusted with conventional techniques by admixing a flow containing exclusively oxygen. If further exploitation of the natural gas reservoir is desired, i.e. exploitation wherein the $CO_2$ level increases to above approximately 89 vol. %, the combustion unit has to be adapted to such natural gas mixtures. Also, it is possible to separate $CO_2$ from the natural gas with customary techniques before leading this to the combustion unit in step a).

Where in this specification and claims reference is made to a natural gas reservoir, it will be clear to the skilled person that the method according to the invention is not limited to extraction from and injection into one and the same natural gas reservoir. Extraction can for instance advantageously proceed from different natural gas reservoirs, and the respective flows can be combined so that these can jointly be led to the combustion unit in step a). Injection of the product flow can take place in one or more of these reservoirs, or in other natural gas reservoirs.

By carrying out the method according to the invention, a number of advantage are obtained. Through the injection of the product flow, the emission of $CO_2$ can be limited or even eliminated. Additionally, the use of an oxygen source in which less or no nitrogen is present leads to a decreased NOx emission into the atmosphere and it can even be eliminated without having to provide means to remove the NOx, as is often required in conventional, comparable methods. Further, by underground replacement of natural gas with $CO_2$, pressure drop in the natural gas reservoir can be controlled so that subsidence can be prevented. The $CO_2$ does not have to be separated from natural gas production (up to a total field production of approximately 89% $CO_2$). If the method is used for operating a power station, an increased efficiency is obtained in that flue gas can be completely cooled and the heat present therein can be usefully employed. The method also offers the possibility of extra revenues though the production of a nitrogen flow.

In FIG. 1, a preferred embodiment of the method according to the invention is represented. In it, in an air separation plant an air flow is separated into a flow containing substantially oxygen and a flow containing substantially nitrogen. The energy necessary for this separation step can be supplied by the energy generating step represented. The oxygen flow is passed to the energy generating step together with $CO_2$-containing natural gas. In the example, the $CO_2$ content is 89 vol. % $CO_2$. Such a flow of natural gas is typically obtained at the end of the production period of a natural gas field when exploited with a method according to the invention. In the energy generating step, heat and optionally electrically is produced. The product gases from the energy generating step are led to a compressor. The energy for operating this compressor is preferably at least partly obtained from an expansion unit coupled therewith. Subsequently, the compressed $CO_2$ is injected into the natural gas reservoir via an injection well. The natural gas flow is extracted from a production well and passed to the expansion unit.

The invention will now be elucidated in and by the following example.

EXAMPLE

In Table 1, feed gas mixtures are compared which are suitable for combustion in a conventional gas turbine.

TABLE 1

Compositions of feed gas mixtures suitable for combustion in a gas turbine.

| Parts by volume | component | conventional composition [vol. %] | composition according to the invention [vol. %] |
|---|---|---|---|
| 8 | $N_2$ | 72.73 | |
| 2 | $O_2$ | 18.18 | 18.18 |
| 1 | $CH_4$ | 9.09 | 9.09 |
| 8 | $CO_2$ | | 72.73 |

By making, according to the invention, a feed gas mixture in which the nitrogen is replaced by $CO_2$, it is possible to use natural gas containing 8 parts of $CO_2$ and 1 part of methane. This corresponds to a content of 88.9 vol % of $CO_2$ and 11.1 vol. % of methane which can be present in the extracted natural gas.

The invention claimed is:

1. A method for producing energy from natural gas in a natural gas reservoir and preventing soil subsidence in the natural gas reservoir, comprising the steps of:
   a) admixing an oxygen containing gas with the natural gas and converting said oxygen containing gas and said natural gas in the presence of $CO_2$, into a flow comprising $CO_2$ and water, whereby energy is generated;
   b) removing at least a part of the water from the flow comprising $CO_2$ and water, so that a gaseous product flow is obtained; and
   c) injecting at least a part of said product flow into the natural gas reservoir from which the natural gas has been extracted characterized in that, said oxygen containing gas has a nitrogen content substantially lower than air, wherein injecting at least a part of said product flow into the natural gas reservoir substantially prevents soil subsidence in the natural gas reservoir.

2. A method according to claim 1, wherein step c) is carried out such that the pressure in the natural gas reservoir remains substantially constant.

3. A method according to claim 2, wherein the energy in step a) is generated in the form of heat and electricity.

4. A method according to claim 1, wherein the energy in step a) is generated in the form of heat and electricity.

5. A method according to claim 4, wherein the generated energy is at least partly used for obtaining a flow of oxygen-rich gas.

6. A method according to claim 5, wherein said flow of oxygen-rich gas is obtained by converting water into a flow of oxygen-rich gas and a flow of hydrogen-rich gas.

7. A method according to claim 6, wherein the flow of oxygen-rich gas is used as source of oxygen in step a).

8. A method according to claim 7, wherein the product flow is at least partly used as source of $CO_2$ in step a).

9. A method according to claim 8, wherein in step a) approximately 18 volume % of oxygen is present.

10. A method according to claim 5, wherein said flow of oxygen-rich gas is obtained by separating a flow of air into a flow of nitrogen-rich gas and a flow of oxygen-rich gas.

11. A method according to claim 10, wherein the flow of oxygen-rich gas is used as source of oxygen in step a).

12. A method according to claim 11, wherein the product flow is at least partly used as source of $CO_2$ in step a).

13. A method according to claim 12, wherein in step a) approximately 18 volume % of oxygen is present.

14. A method according to claim 1, wherein the generated energy is at least partly used for obtaining a flow of oxygen-rich gas.

15. A method according to claim 14, wherein said flow of oxygen-rich gas is obtained by converting water into a flow of oxygen-rich gas and a flow of hydrogen-rich gas.

16. A method according to claim 14, wherein said flow of oxygen-rich gas is obtained by separating a flow of air into a flow of nitrogen-rich gas and a flow of oxygen-rich gas.

17. A method according to claim 14, wherein the flow of oxygen-rich gas is used as source of oxygen in step a).

18. A method according to claim 1, wherein the product flow is at least partly used as source of $CO_2$ in step a).

19. A method according to claim 1, wherein in step a) approximately 18 volume % of oxygen is present.

20. A method for preventing pressure drop in a natural gas reservoir and soil subsidence in the natural gas reservoir, comprising the steps of:

a) admixing an oxygen containing gas with the natural gas and converting said oxygen containing gas and said natural gas in the presence of $CO_2$, into a flow comprising $CO_2$ and water, whereby energy is generated;

b) removing at least a part of the water from the flow comprising $CO_2$ and water, so that a gaseous product flow is obtained;

c) injecting at least a part of said product flow into the natural gas reservoir from which the natural gas has been extracted characterized in that, said oxygen containing gas has a nitrogen content substantially lower than air, wherein injecting at least a part of said product flow into the natural gas reservoir substantially prevents soil subsidence in the natural gas reservoir; and d) using $CO_2$ in said product flow for preventing pressure drop in the natural gas reservoir.

* * * * *

UNITED STATES PATENT AND TRADEMARK OFFICE
CERTIFICATE OF CORRECTION

PATENT NO. : 7,281,590 B2  Page 1 of 1
APPLICATION NO. : 10/149041
DATED : October 16, 2007
INVENTOR(S) : Wouter Willem van de Waal It is certified that error appears in the above-identified patent and that said Letters Patent is hereby corrected as shown below:

Column 1, Line 7, "fiber" should read --further--;

Column 2, Line 24, "present" should read --presence--;

Column 2, Line 33, "exchanger" should read --exchangers--;

Column 4, Line 8, "flaw" should read --flow--;

Column 4, Line 63, "Thine" should read --The--;

Column 5, Line 45, "though" should read --through--.

Signed and Sealed this

Fourteenth Day of October, 2008

JON W. DUDAS
*Director of the United States Patent and Trademark Office*